US010387675B2

(12) United States Patent
Adams et al.

(10) Patent No.: US 10,387,675 B2
(45) Date of Patent: Aug. 20, 2019

(54) INDIRECT INDICATIONS FOR APPLYING DISPLAY PRIVACY FILTERS

(71) Applicant: BlackBerry Limited, Waterloo (CA)

(72) Inventors: Neil Patrick Adams, Waterloo (CA); Jeremy Lawson Kominar, Waterloo (CA); Clara Margarida Severino, Toronto (CA); Adam Richard Schieman, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 168 days.

(21) Appl. No.: 15/453,453

(22) Filed: Mar. 8, 2017

(65) Prior Publication Data
US 2018/0260581 A1 Sep. 13, 2018

(51) Int. Cl.
*G06F 21/62* (2013.01)
*G06F 21/84* (2013.01)

(52) U.S. Cl.
CPC .......... *G06F 21/6245* (2013.01); *G06F 21/84* (2013.01); *G06F 2221/032* (2013.01); *G06F 2221/2111* (2013.01)

(58) Field of Classification Search
CPC . G06F 21/6245; G06F 21/84; G06F 2221/032
USPC ........................................................ 726/26
See application file for complete search history.

(56) References Cited

U.S. PATENT DOCUMENTS

| 5,801,697 | A | 9/1998 | Parikh et al. |
| 6,757,713 | B1 | 6/2004 | Ogilvie et al. |
| 7,912,908 | B2 | 3/2011 | Cai et al. |
| 7,929,960 | B2 | 4/2011 | Martin et al. |
| 8,078,869 | B2 | 12/2011 | Adams et al. |
| 8,386,778 | B2 | 2/2013 | Adams et al. |
| 8,548,452 | B2 | 10/2013 | Coskun et al. |
| 8,781,838 | B2 | 7/2014 | Krause |
| 9,154,469 | B2 | 10/2015 | Adams et al. |
| 9,178,699 | B2 | 11/2015 | Lambert et al. |
| 9,235,711 | B1 | 1/2016 | Xavier |
| 2010/0124363 | A1 | 5/2010 | Ek et al. |
| 2015/0178501 | A1* | 6/2015 | Robison ................. G06F 21/60 726/26 |

(Continued)

FOREIGN PATENT DOCUMENTS

| WO | 0127724 | 4/2001 |
| WO | 2004077782 | 9/2004 |
| WO | 2006104810 | 10/2006 |

OTHER PUBLICATIONS

Extended Search Report issued for European Application No. 18157451.8, dated Jun. 14, 2018. Jun. 14, 2018.

(Continued)

*Primary Examiner* — Brandon S Hoffman
*Assistant Examiner* — Nega Woldemariam
(74) *Attorney, Agent, or Firm* — Jeffrey N. Giunta; Fleit Gibbons Gutman Bongini & Bianco P.L.

(57) ABSTRACT

A system and method for automatically applying display privacy filters. Content to be displayed on a device is received. An indirect indication of a condition of the device that is associated with applying a display privacy filter to a presentation of the device is received. Based on receiving the indirect indication, the display privacy filter to presentations of the content.

20 Claims, 6 Drawing Sheets

(56) References Cited

U.S. PATENT DOCUMENTS

| | | | |
|---|---|---|---|
| 2015/0371049 A1* | 12/2015 | Xavier | G06T 11/60 |
| | | | 726/26 |
| 2016/0261532 A1 | 9/2016 | Garbin et al. | |
| 2016/0360152 A1 | 12/2016 | Karimi-Cherkandi et al. | |
| 2017/0012946 A1 | 1/2017 | Lambert et al. | |

OTHER PUBLICATIONS

Preliminary Examination Report issued for Chinese Patent Application No. 201810188825.9, dated Apr. 17, 2018.
U.S. Appl. No. 15/255,960, filed Sep. 2, 2016, BlackBerry Limited.
Asterino, M., "How Do I Send Disappearing Messages on my iPhone? Invisible Ink!", Sep. 10, 2016 (https://www.payetteforward.com/how-do-i-send-disappearing-messages-on-my-iphone-invisible-ink/, pp. 1-3.).
U.S. Appl. No. 14/930,179, filed Nov. 2, 2015, BlackBerry Limited.

* cited by examiner

INDIRECT INDICATIONS FOR APPLYING DISPLAY PRIVACY FILTERS

FIELD OF THE DISCLOSURE

The present disclosure generally relates to controlling user interface displays, and more particularly to identifying when to apply privacy filters to displayed content.

BACKGROUND

Electronic devices are often able to present various types of content to a user. In some situations, it may be desired to protect the presentation of content from others near the device that is displaying the content. Software display privacy filters, which operate to blur or obscure content presented on a device display, may operate to protect the displayed content from others near the device.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
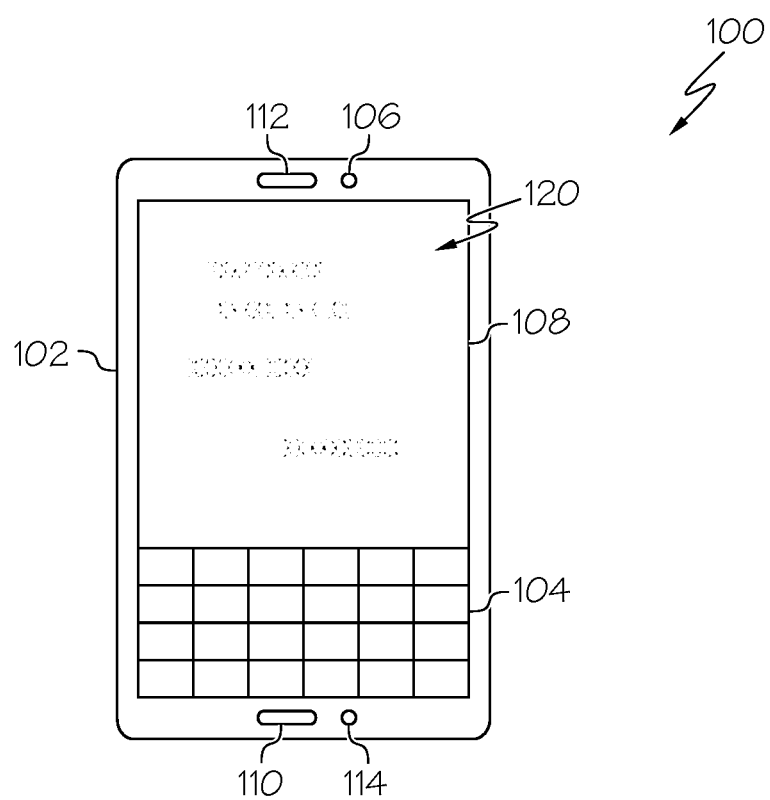
FIG. 1 illustrates a electronic device user interface view, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods operate to improve security and privacy to protect certain types of content that are displayed on electronic devices. In various examples, the below described systems and methods operate to detect and automatically respond to indirect indications that a display privacy filter should be applied to presentations of content on a display of an electronic device. In various examples, an indirect indication is able to be any type of input, observation, circumstance, context, other indicia, or combinations of these, that is not an explicit, direct command to apply a display privacy filter to a presentation of content. As described below, an electronic device in various examples is able to recognize one or more of a wide variety of inputs as indirect indications and to respond to such indirect indications by automatically applying display privacy filters to the presentation of content. In various examples, indirect indications are able to include one or more of any type of observations, device contexts, user inputs of various types of data, other circumstance, or combinations of these. In various examples, display privacy filters are able to be automatically applied before content is presented or more quickly after a situation in which such a display privacy filter would be desired. The below described systems and methods thus improve the privacy and protection of sensitive content by automatically applying display privacy filters upon the recognition of the occurrence of certain criteria as opposed to requiring input of a direct command to apply such a display privacy filter.

Indirect indications in various examples can include two general types. One type of indirect indications is referred to as "manual methods" and include certain specified actions a user is able to take to provide input into the device. Examples of manual methods include, but are not limited to, the following.

A multi touch gesture, such as a three (3) finger swipe down on the screen.

The user presents a fingerprint. In some examples, merely presenting a fingerprint through a fingerprint reader on the device is an indirect indication. In an example, the presented fingerprint does not have to be authenticated to serve as an indirect indication. In further examples, the indirect indications are fingerprints that have been authenticated. In some examples, an indirect indication to apply a display privacy filter is able to be an authenticated or unauthenticated fingerprint but removal of the display privacy filter is only performed based on authenticated fingerprints. In such an example, removal of the display privacy filter depends on a more strict condition because the security/privacy of the presented information is being decreased while turning on the display privacy filter increases security and thus can be applied by anyone with access to the device.

A response to a notification presented to the user. When receiving a notification, such as receipt of an e-mail message, a user's response to that notification is able to be an indirect indication. In some examples, any response to a particular type of notification, such as receipt of an e-mail message, is an indirect indication that causes the e-mail message to be displayed with a display privacy filter. In some examples, a particular response, such as a particular swipe, is an indirect indication.

Activation through a quick setting. In some examples, a user interface allows a user to easily bring up a user interface component to configure certain aspects of the device. Once such aspect is able to be enabling or disabling a display privacy filter.

Entering a particular keyword or emoji. An indirect indication can be a user's entering a particular input. After the user enters a particular pattern, such as a keywords or code indicating an emoji, that text or character is able in some examples to be automatically removed from the content before (or shortly after) the display privacy filter is applied. Removing the entered text that serves as an indirect indication provides a convenient and discrete way of enabling a display privacy filter while typing sensitive content without drawing attention to the act of enabling it.

Another type of indirect indications is referred to as "automatic methods." Automatic methods generally include indications that are unrelated to a user's actions and are related to the operation of the electronic device. Examples of automatic methods include, but are not limited to, the following.

Viewing a particular type of content. For example, viewing of certain MIME file type is able to be an indirect indication.

An indicated sensitivity of the presented content. For example, email messages are able to have certain message classifications which can be sent by an administrator, such as unclassified, secret, or top secret. Viewing content with a particular classification is able to be an indirect indication that causes a display privacy filter to be automatically applied to the display of the content. In another example, a secure message, such as an e-mail message containing content secured by S/MIME or PGP, or content that is one or more of signed with a cryptographic signature, encrypted, or signed and encrypted, may have the display privacy filter automatically applied.

Content that is addressed to a particular recipient. For example, an indirect indication may be a user composing an e-mail that is addressed to a particular person, in which case a display privacy filter is automatically applied once the address of that particular person is entered into the "to:" field of the e-mail composition interface.

A particular mode of an application. In an example, an application is able to be programmatically configured to enable the display privacy filter based on various conditions of the application.

Presenting content received from a particular application or a particular web page. In an example, a list of applications, web pages, other content sources, or combinations of those, can be created and loading content from one of those sources is an indirect indication that causes the display privacy filter to be automatically applied.

Detecting a number of people in a position to view the display of the device or a number of nearby people. In an example, a camera on the device captures an image of object in a position where a person could view the display of the device. Processing of that image could detect the number of persons in a position to view the display and detecting more than a certain number is an indirect indication that causes a display privacy filter to be automatically applied. In an example, it is assumed that only the user is an authorized view of the content and if more than one person is able to view the display, then a display privacy filter is applied to presentations of content while more than one person is in such a position. In further examples, other maximum number of viewers may be specified, such as a situation where the user of the device is sharing the display of content with a known number of other persons. In some examples, a number of persons near the device is able to be estimated based upon processing audio signals detected by a microphone on the device. In an example, voice recognition processing is able to be used to detect voices of different individuals and estimate a number of nearby individuals. In some examples, detecting a number of nearby people is able to be combined with other indirect indications, such as viewing a sensitive document, to trigger applying a display privacy filter.

A classification of an application providing content to be presented. In an example, an application repository, such as an "app store," from which a device is able to obtain applications is able to classify applications that a device can install. In an example, classifications include maturity ratings, such as G, PG, or R. Other classifications are able to indicate, a type of application, such applications categorized as adult, productivity, or the like.

A prevalence of other users enabling a display privacy filter when viewing the presented content or when using an application providing the content. In an example, indications of such prevalence can be determined based on crowd sourcing of privacy configuration settings for the application providing content to be presented.

A sensitivity level of a displayed e-mail message. Some e-mail messages in an example are able to be marked "private" or "sensitive" and displaying content in messages with such markings is able to be an indirect indication.

A geographical location of the device. In some examples, geographic locations or areas are able to be specified and an indirect indication is whether the device is located within one or is not located within a defined geographical location or area automatically causes a display privacy filter to be applied to content presented on the display of the device.

Occurrence of particular times of day. In some examples, an indirect indication is able to include particular times of day. For example, a device is able to be configured to apply a display privacy filter during a user's commute time when the user is typically riding a bus. The determination of particular times of day, or times of days of particular days of the week, is able to be based on any suitable technique. In various examples, times of day during which a display privacy filter is applied is able to be specified by a user, determined based on past usages of a display privacy filter over time, based on any other criteria, or combinations of these. In an example a particular time of day is able to be a time of a particular meeting, or type of meeting, that is scheduled for an individual associated with the device. The time of such a scheduled meeting is able to be determined based on, for example, data within a scheduling application for the user either maintained on the device or external to the device. In some examples, times of day are able to be combined with other observations such as location, speed of movement, particular Wi-Fi® access, other criteria, or combinations of these. In some examples, such indirect indications are able to be associated with one or more particular applications, device usages, other conditions, or combinations of these.

Placing the device face up in a motionless horizontal position. In some examples, an indirect indication is a detection that the device it is motionless, horizontal, face up position. An example of such a position is placing the device on a table with its display "face up." "Face up" in this context is able to refer to any one or more positions into which a particular device is able to be placed that allows a display of the device to be viewable by people near the device. In general, a device is able to be placed "face down," e.g., placed on a table with the display of the device facing the table top and thus not visible to persons, to prevent people from viewing the device's display. When placing a device "face down," a user of the device is unable see notifications presented on the display. In some examples, that user who places a device "face down" may have to disrupt a meeting or other activity to periodically turn the device back over to see if any notifications have occurred. In an example, a display privacy filter that is applied based on a detection of the device being placed face up in a motionless horizontal position provides privacy similar to a "face down" device even though the device is "face up."

A device that uses a detection of being placed face up in a motionless horizontal position as an indirect indication is able to provide several advantages. In an example, a display privacy filter that obscures the image being displayed except for the most recently received notification is able to be automatically applied when the device is placed "face up." In such an example, a user of the device is able to view recently received notifications without touching the device when that device is placed on a table during a meeting. In another example, a user giving a presentation is able to configure a device to automatically apply a display privacy filter that obscures the image being displayed except for notes regarding the information being currently presented in the presentation. In both of these examples, images presented on the display of the device are protected from viewing by other people in the meeting and the user is able to see data of interest without disrupting the meeting by picking up the device. In an example a display privacy filter that is applied based on a detection of the device being placed face up in a motionless horizontal position is able to slowly increase an amount of blurring or other obscuring, such as darkening or blanking, applied by the filter to obscure portions of the presented image.

Based upon the design of the display, battery savings in some devices is able to be achieved in examples of display privacy filter that obscure portions of the screen by blanking or darkening those portions. For example, Organic Light Emitting Diode (OLED) displays will consume less energy when most of the display is blanked or darkened.

The above described indirect indications are examples of events or conditions that cause a display privacy filter to be automatically applied. In various examples, indirect indicators that cause the application of a display privacy filter are able to be specified to be only one of the above indirect indications, to be a specified subset of the above indirect indications, to be any of the above described indirect indications, to be other indications, or any combinations of these. In some examples, indirect indicators that cause a display privacy filter to be applied are able to be defined as a specified combination of two or more of the above indirect indicators, such as an occurrence a particular time of day while the device is located within a specified geographic area or a combination of detecting that the device is placed face up in a motionless horizontal position during time of day corresponding to a meeting scheduled for a user of the device.

In various examples, any one or any combination of two or more of the above indirect indication is able to be used to cause a display privacy filter to be applied to displayed content. In some examples, once a display privacy filter is being used, a device may be configured to remove application of the display privacy filter only based on more restrictive actions. For example, any of the above may be used to cause a display privacy filter to be applied. Removal of the display privacy filter in an example may be limited to authenticated fingerprints, other authenticated identifications of a particular user, entry of passwords or other credentials, other actions, or combinations of these. In such examples, removal of the display privacy filter depends on a more strict condition because the security/privacy of the presented information is being decreased while turning on the display privacy filter increases security and thus can be applied by anyone with access to the device. In further examples, removal of a display privacy filter is able to be by any suitable action, such as a reoccurrence of any or all of the indirect indicators described above, any action, or combinations of these.

A display privacy filter that is used in the below described systems and methods is able to be any type of processing that is applied to content that obscures or renders a presentation of that content unintelligible to an observer. In an example, a display privacy filter obscures the entire image being presented on the display and allows a user to provide inputs to expose a portion of the content without being obscured. In such an example the display privacy filter receives an input, such as an object touching a point on a touch sensitive display, and based on receiving that input a small area of the obscured display is presented in an unobscured, clear form to allow the user to clearly view a portion of the displayed content. In another example, a display privacy filter operates by obscuring most of the image being presented on the display but leaves a relatively small portion of that image unobscured and in clear form even without any input by a user. In another example, a display privacy filter obscures the entire image being presented on the display and allows a user to provide inputs to expose a portion of the content without being obscured, as described above. However, in this example, the relatively small portion of that image unobscured and in clear form remains unobscured and in clear form after removal of the input, such as removal of an object touching the display. In some examples, the above variations are able to be selected based upon any criteria, such as device configurations, enterprise policies, other criteria, or combinations of these.

In these examples, an input is then able to be received to move the small area presenting an unobscured, clear form of the image. For example, movement of a point of contact of an object, such as a user's finger, on the screen is able to operate to expose other portions of the display. In an example, moving the contact point causes the previously exposed content near the earlier contact point to be obscured. By moving the contact point over a large portion of the touch sensitive display, a user can gradually view the entire displayed content. Further description of display privacy filters is provided in a commonly assigned application filed on even date with the present application, entitled "DATA MESSAGING WITH PRIVACY TOKENS," the entire contents and teachings of which are hereby incorporated herein by reference.

In an example, a privacy display mode for displaying content is an example of a privacy filter. A privacy display mode in an example allows users view private information in public places by obscuring portions of the screen that are not being actively viewed/used.

In an example, a privacy display mode is able to be implemented by creating two presentation image layers. A first presentation image layer contains the contents to be presented, and a second presentation layer is an obscured version of the content to be presented. In an example, an initial presentation of content includes a presentation with the second presentation layer presented "over" the first presentation layer so as to obscure the first presentation layer. In an example, when a user presses their finger on the screen, a mask or "hole" is cut out of the second presentation layer, allowing the user to see through the blurring and obscuring. When the user lifts the finger from the screen, the content is then obscured again.

In one example, a privacy display mode is able to obscure selected portions of the display by darkening those selected portions. In an example an Organic Light Emitting Diode (OLED) display is able to not illuminate, e.g., "turn off," portions of the display that are to be obscured while only illuminating the unobscured portions of the display that are to be exposed on the display.

In some examples, various modes are able to be used to expose unobscured content when the user selects an area of the display, such as by touching the display at a location. In one example, a "word mode" or "circle mode" exposes an exposed portion of the content as a circular area or other area of unobscured content in an area near the user's touching of the display. In another example, a "line mode" exposes an exposed portion of the content as a horizontal line of a suitable height, such as a height corresponding to one line of text. A "partial mode" always leaves a portion of the display exposed while the remainder of the display is obscured. A "smear mode" exposes a first portion of an exposed portion and gradually obscures a remaining portion of the exposed portion outside of the first portion. The first portion in an example is selected by an input from a user, such as a touching of the screen, on the display and leaves it exposed for an interval of time. The "smear mode" allows portions of the display to be exposed by moving the selected location and thus exposing the content along the path where the user's finger touched within that time interval. A "typing mode" exposes a circle or other area around an insertion point in the content where the user is typing data. In an example, the exposed area in "typing mode" is obscured after a user types a particular character, such as a "space" character.

One mode referred to as "input mode" is an example of "partial mode" that obscures all of the display except for a line that corresponds to an area of the display that presents text or other data that a user is presently inputting. In an example of "input mode," an instant messaging application is able to operate by exposing only the last 'part' of the conversation, which is generally the portion that is of greater interest to the user (the size of the exposed portion could change with the height of newly received height). In one example of "input mode," the rest of the conversation stays obscured unless explicitly revealed by touching the screen. In further examples of "input mode," another mode, such as the above described "word mode," "line mode," "smear mode," other modes," or combinations of these, are able to be used for the remainder of the display outside of the "input" line that is exposed in "input mode." In an example, a particular mode, such as "word mode," "line mode," "smear mode," other modes," "input mode," or combinations of these, are able to be selected by a user via any suitable technique. In some examples, once a particular mode is selected, that last choice is stored and used the next time information is to be presented with a privacy display mode. In some examples, different selections are able to be individually stored and used for different applications, activities, display screens within applications, other conditions, or combinations of these.

In various examples, the amount of blurring, obscuring, darkening, other hiding effects, or combinations of these, are able to be configurable. In an example, less blurring or other obscuring allows the content to faintly make out where content is present on the screen in order to determine where to touch the screen. In an example, the opacity around text and images could be 100% so the user would only see "blocks" of obscured content.

In general, the systems and methods described below are applicable to any type of device. In various examples, these systems and methods are applicable to any type of electronic device that is able to be used in any type of operational environment. In some examples, these systems and methods are able to be included in desktop systems, physically installed systems, other systems that are not intended to be frequently moved, or in combinations of these. In further examples, these systems and methods can be incorporated into one or more of portable electronic devices, which include devices that are easily carried by a person or other carrier; or mobile devices including smartphones, tablets, phablets, wearable devices, and include devices mounted in movable systems such as vehicles of any type. In various examples, these electronic devices are able to be located in vehicles that include, but are not limited to, motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising. These electronic devices are also able to include fixed devices, which include devices that are not designed to be easily or often relocated such as desktop electronic equipment; other types of electronic equipment, or combinations of these. Other examples of devices include an endpoint device, IoT (Internet of Things) device, EoT (Enterprise of Things) device, etc.

FIG. 1 illustrates an electronic device user interface view 100, according to an example. The electronic device user interface view 100 depicts an example electronic device 102 that detects and responds to indirect indications for applying display privacy filters. The electronic device 102 is able to be any suitable type of electronic device.

The electronic device user interface view 100 includes a display 104 that is able to present content to a user of the electronic device 102. In some examples, the display 104 is a touch sensitive display that receives user inputs based upon a user's touching a portion of the screen. The depicted display 104 in this example electronic device user interface view 100 includes a virtual touch screen keyboard 108 allows a user to enter alpha-numeric data into processing performed by the electronic device. In further examples, other user input facilities are able to be included in, in communications with, or otherwise interfacing with, the electronic device 102 to allow a user to provide alpha-numeric input.

The display 104 is shown to be displaying images that have been obscured with a display privacy filter. In various examples, touch sensitive input facilities of the display 104, other user input components such as track balls or arrow keys (not shown), other components, or combinations of these are able to be used to allow a user expose portions of the obscured display.

The depicted electronic device 102 further includes a camera 106. The camera 106 in this example is a front facing camera that is able to capture images of objects in front of the display 104. In an example, as is described in further detail below, the camera 106 is able to capture images of persons who have a view of the display 104. Processing of such images is able to determine a number of persons who have a view of display 104 and thus cause a display privacy filter to be applied when presenting content on the display 104

The depicted electronic device 102 further includes a fingerprint sensor 110 to sense a fingerprint of a user. In an example, a user is able to place a finger on fingerprint sensor 110 as a form of input. The fingerprint sensor 110 detects that a finger touched the sensor and collects data defining the fingerprint of that finger.

The depicted electronic device 102 includes a microphone 114. Microphone 114 in some examples is able to be used to support voice communications conducted by the electronic device 102, such as a phone call. In some examples, the microphone 114, or similar sound sensing component, is able to receive voice commands from a user to control the device. In some examples, the voice commands may be commands to alter or control the operation of a display privacy filter being used to obscure content presented on the display 104. In some examples, sound information detected by microphone 114, or other sound sensing components, is able to be process to determine a level of activity in the vicinity of the electronic device 102. In some examples, detection of an increased level of activity, as is evidenced by a level of ambient noise being above a threshold, may be a basis for causing the application of a display privacy filter when presenting content on the display 104. The depicted electronic device 102 further has an earpiece 112. Earpiece 112 produces sound in an example that supports using the electronic device 102 for voice communications.

Figure 2:
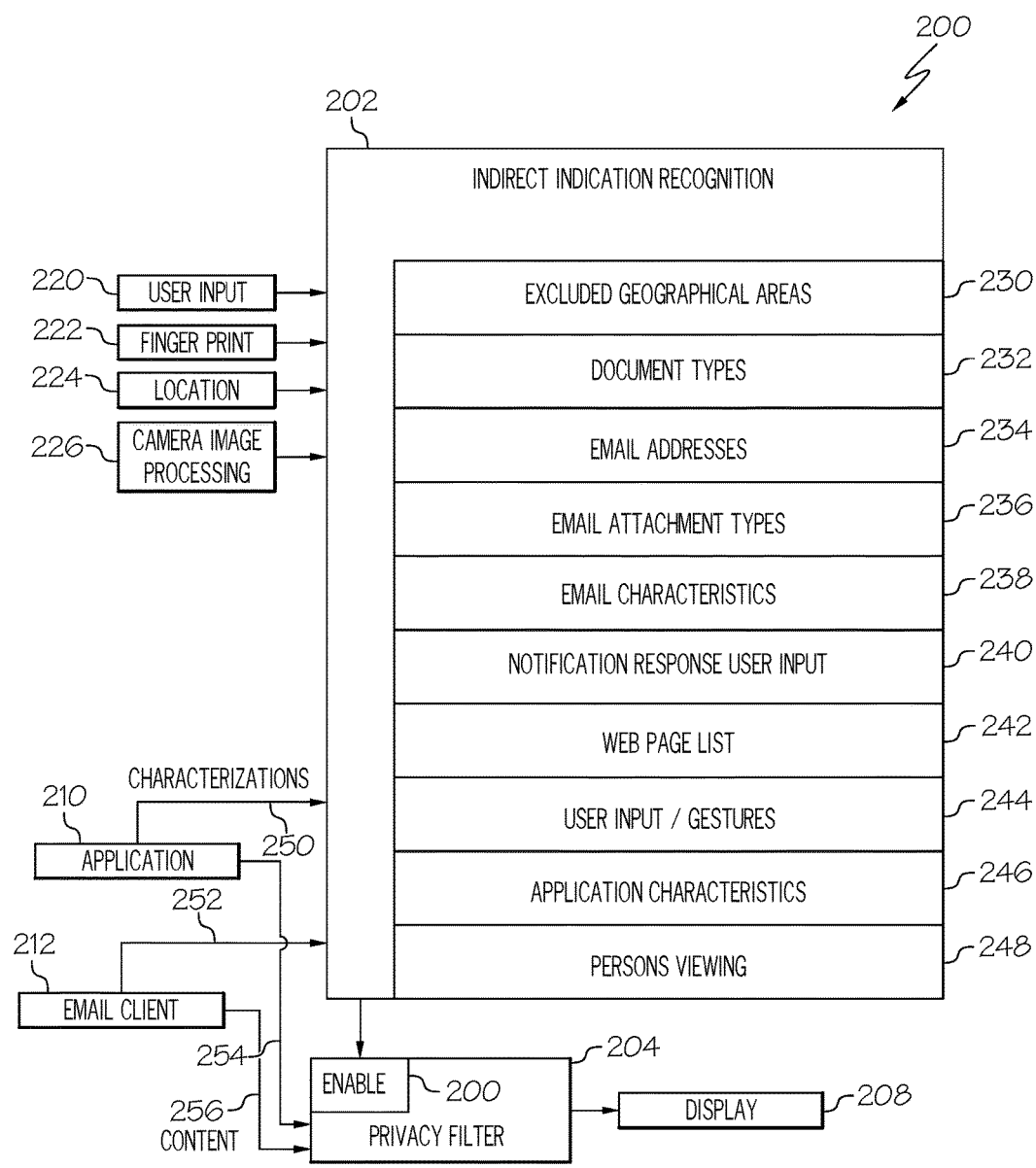
FIG. 2 illustrates a device component interaction diagram, according to an example.

FIG. 2 illustrates an indirect indication recognition component 200, according to an example. The indirect indication recognition component 200 depicts certain components of an electronic device, such as the above described electronic device 102, and configuration data in an example that controls automatically applying a display privacy filter. In some examples, a display processor includes some or all of the components illustrated in the indirect indication recognition component 200.

The indirect indication recognition component 200 includes an indirect indication recognition component 202. The indirect indication recognition component 202 in an example includes an indirect indication recognition process that receives various data items and operates to determine whether to apply a display privacy filter when presenting content on a display of a device. In an example, the indirect indication recognition component 202 is configured to recognize specified events, conditions, other items, or combinations of these, as indirect indications to apply a display privacy filter to presented content.

The indirect indication recognition component 202 in an example is configured with a storage that contains definitions of one or more events, occurrences, activities, other sensed occurrences, or combinations of these, that are a basis for applying a display privacy filter to presented content. The data items stored in the indirect indication recognition component 202 of a particular electronic device are able to be defined, modified, maintained, otherwise created or altered, or combinations of these, by any suitable technique. In some examples, the data items in the indirect indication recognition component 202 can be set or selected by any one or more of a user of the electronic device, Information Technology (IT) personnel administering the operational configuration of the electronic device, by any other suitable technique, or by combinations of these. In some examples, the indirect indication recognition component 202 is able to be partially stored or implemented by components external to the electronic device being controlled according to the configurations defined in the indirect indication recognition component 202.

The indirect indication recognition component 202 includes definitions of excluded geographical areas 230. In some examples, an electronic device is able to be configured to apply a display privacy filter to presentations of content when the device is in specified geographical areas. Such definitions of geographical areas are able to be in any suitable form. In an example, geographic areas are able to be defined where a display privacy filter is to be applied when the device is within the defined area. In a further example, an electronic device is able to be configured to apply display privacy filters whenever the electronic device is not within a geographic area contained in the excluded geographical areas 230.

The indirect indication recognition component 202 includes definitions of document types 232. In some examples, an electronic device is able to be configured to base applying a display privacy filter to presentations of content based on determining that the content is contained within document types, such as word processing documents, image documents, other document types, or combinations of these. A document type is an example of a characterization of the document. The type of a particular document is able to be determined by any suitable technique. For example, some electronic devices store metadata defining the type of some stored documents. In some examples, the document types 232 is able to store characterizations of an application file that are in the form of settings associated with documents, or other types of application files, that serve as an indirect indication that a display privacy filter should be applied when presenting content contained in that application file. In an example, an electronic device is able to be configured to apply display privacy filters when displaying content contained in a document whose type is listed in the documents types 232. In another example, the electronic device is able to be configured to applying display privacy filters when displaying content contained in any document except for documents whose type is listed in the documents types 232.

The indirect indication recognition component 202 includes definitions of e-mail addresses 234. In some examples, an electronic device is able to be configured to base applying a display privacy filter to presentations of content when displaying contents of e-mail messages that include certain e-mail addresses in one or more of their address lines. In various examples, the e-mail addresses 234 is also able to specify that display privacy filters are to be applied based on a specified e-mail address appearing on a particular address field of the message, such as in one or more of the "to:" field, "from:" field, "cc:" field, other field, or combinations of these. In an example, an electronic device is able to be configured to applying display privacy filters when the e-mail address includes one of the specified e-mail addresses, or to apply display privacy filters when displaying content for all e-mail messages except for e-mail messages that include one or more of the certain e-mail address in the e-mail addresses 234.

The indirect indication recognition component 202 includes definitions of attachment types 236. In some examples, an electronic device is able to be configured to apply a display privacy filter to presentations of content that is contained within e-mail attachments that are of a particular type. In an example, particular attachment types are able to be defined based on indications specified in an e-mail according to the Multipurpose Internet Mail Extension (MIME) standard. In an example, an electronic device is able to be configured to apply a display privacy filter when presenting content contained in any attachment indicated to be an Secure/MIME (S/MIME) attachment. A type of e-mail attachment in various examples is able to be determined based on any suitable technique. In an example, an electronic device is able to be configured to applying display privacy filters when displaying content contained in an e-mail attachment whose type is listed in the e-mail attachment types 236. In another example, the electronic device is able to be configured to applying display privacy filters when displaying content contained in attachments of any e-mails except attachment types defined in the with e-mail attachments types 236.

The indirect indication recognition component 202 includes definitions of e-mail characteristics 238. In some examples, an electronic device is able to be configured to base applying a display privacy filter to presentations of content when displaying contents of e-mail messages that have certain characteristics. In various examples, applying a display privacy filter is able to be based on any characteristic of an e-mail. In an example, e-mail characteristics are able to include an indication of sensitivity of content within the e-mail message. For example, some e-mail messages are able to include a specification of a security classification for the e-mail contents, such as "unclassified," "secret," or "top secret." Another e-mail message characteristic is whether the message is one or more of signed, encrypted or both. In an example, the e-mail characteristics 238 is able to specify that a display privacy filter is to be applied when displaying content that has one or more specified classifications, is encrypted, is signed, or combinations of these. Conversely, the specification may indicate that display privacy filters are to be applied when presenting the contents of any e-mail except those with characteristics specified in the e-mail characteristics.

The indirect indication recognition component 202 includes definitions of notification response user input 240. In some examples, an electronic device is able to be configured to base applying a display privacy filter to presentations of content based on receiving a particular user response to a notification of an event that is provided to the user. In an example, an electronic device may provide a notification of an event, such as the receipt of an e-mail, and the user may provide one or more different inputs to indicate a response to that notification.

In the example of an e-mail, a notification may give some description of the message, such as its subject line, e-mail address information of a sender or various receivers of the message, other information, or combinations of these. In an example, the electronic device may be configured to respond to a particular response to such a notification, such as a swipe of a touch screen in a particular direction, by opening the received e-mail and applying a display privacy filter to the presentation of the message content. In various examples, the notification response user input 240 is able to specify that a display privacy filter is to be applied when: one or more particular user responses are provided to any notification, a particular response is provided to a particular notification, any response is provided to a particular notification, other notification related scenarios, or combinations of these. In various examples, an electronic device is able to be configured to apply display privacy filters when displaying content in response to a user input response to a notification that specified in the notification response user input 240. In various examples, a display privacy filter is applied when a notification/user response specified in the notification response user input 240 is provided, or is applied at all times except when a user input specified in the notification response user input 240 is provided. In general, a display privacy filter is able to be applied according to any specification or combination of specifications in the notification response user input 240.

The indirect indication recognition component 202 includes a web page list 242. In general, various examples are able to specify any remotely accessed content in the web page list 242. In some examples, an electronic device is able to be configured to apply a display privacy filter to presentations of content that is contained in data stores indicated in the web page list 242. In an example, the web page list 242 includes a list of Uniform Resource Locators (URLs) for web pages. A listing of a URL or other identifier of a web page or any type of document or data file in the web page list 242 is an example of a stored setting associated with that web page, document, or data file. In an example, an electronic device is able to be configured to apply display privacy filters when: displaying content obtained from a URL in the web page list 242, for displaying all content except that obtained from a URL in the web page list 424, or any combination.

The indirect indication recognition component 202 includes a user input/gestures 244. In general, various examples allow a user to quickly apply a display privacy filter based upon a specified user input. The user input/gestures 244 is are able to specify any type of user input or combinations/sequences of user inputs that will cause the device to apply a display privacy filter when displaying any content. In various examples, the user input/gestures 244 is able to include specifications of various types of gestures, such as various multi-touch gestures. In an example, the user input/gestures 244 is able to define a three finger swipe down on the screen at any time, or within certain active applications, as a gesture to cause the immediate application of a display privacy filter. In another example, the user input/gestures 244 is able to define an input pattern, such as a character sequence, that a user is able to enter, such as on the virtual touch screen keyboard 108, that will cause the immediate application of a display privacy filter. In some examples, the character sequence is able to be a keyword or correspond to an emoji. In some examples, the electronic device is able to be configured to remove the entered character sequence, such as the keyword, or emoji in from the content before (or shortly after) the filter is applied. In an example, automatically removing the entered character sequence or other input from the content allows for a convenient and discrete way of enabling a display privacy filter while typing sensitive content without drawing attention to the fact the user is enabling have enabled it. In an example, another form of user input is for the user to perform a fingerprint scan using the fingerprint sensor 110.

The indirect indication recognition component 202 includes definitions of application characteristics 246. Characteristics stored in the application characteristics 246 are able to be any type of characteristic for an application. In an example, an application may have a classification, such as a maturity level defined for example by maturity ratings "G," "PG," or "R." An electronic device in such an example is able to be configured to automatically apply a display privacy filter based upon that maturity rating of the presently active application. In another example, display privacy filters are able to be applied based on of a presently active application. In an example, one or more applications may specify in the application characteristics 246 that one or more modes of that application should automatically have a display privacy filter applied to presented content.

In an example, data is available regarding how often users of other devices have enabled display privacy filters when a particular application is active. Such data is able to be available, for example, from data collected from the application developer, a supply of the application such as an "App Store," from any other source, or combinations of these. In an example, one or more of these data sources analyzes this data to determine how prevalent applying display privacy filters is for one or more applications. Based on such an analysis, an indication of a prevalence of display privacy mode setting enabled by a plurality of other users of the application on other devices is determined and provided to electronic devices. Such indications are able to be stored in the application characteristics 246 in an example.

The indirect indication recognition component 202 includes a persons viewing specification 248. As is described in further detail below, processing is able to estimate or determine how many persons are in a viewable location of a display of the electronic device. The persons viewing specification is able to specify a maximum number of that can be in a viewable location before a display privacy filter is applied to content being displayed. In an example, the persons viewing specification is able to specify that a display privacy filter is to be applied when more than one person is in a viewable location of the display. In further examples, the persons viewing specification 248 may specify other observations that indicate the presence of other persons, such as ambient noise levels or detected sounds, other observations, or combinations of these.

The indirect indication recognition component 200 depicts a display 208. The touch sensitive display 104 described above is an example of a display 208. The display 208 operates to present images or other content a user of a device.

The indirect indication recognition component 200 depicts user input 220. The user input 220 in various examples is able to include one or more components that are able to receive inputs from a user. With regards to the above described electronic device 102, the user input 220 includes the above described touch sensitive input components of display 104, the virtual touch screen keyboard 108, and microphone 114, and fingerprint sensor 110. In some examples, the camera 106 is also able to act as a user input to, for example, detect gestures made by a user of the electronic device 102. In general, the user input 220 is able to include any number of components that receive inputs from a user.

The indirect indication recognition component 200 depicts a fingerprint sensor 222. The above described fingerprint sensor 110 is an example of the depicted fingerprint sensor 222. As described above, a user's performing a fingerprint scan is able to be defined, by the user input/gestures 244 described above, as an indirect indication to apply a privacy filter.

The indirect indication recognition component 200 depicts a location sensor 224. The location sensor 224 in an example is a Global Positioning System (GPS) or similar apparatus that provides a geographic location for the electronic device. The excluded geographic areas 230 is able to specify geographic locations at which a display privacy filter is to be applied.

The indirect indication recognition component 200 depicts a camera image processing component 226. The persons viewing specification 248 is able to specify a maximum number of persons in a viewable location of the display 208 of the device. The camera image processing component 226 in an example includes an image processor that performs image processing to determine a number of persons in such a viewable location and reports that number to the indirect indication recognition component 202.

The indirect indication recognition component 200 depicts an application 210 and an e-mail client 212. The application 210 and e-mail client 212 are examples of sources of content that are to be presented to a user on the display 208. In general, a device is able to have a number of applications that can be selected to run and be an active, current application. The application 210 provides application characteristics 250 to the indirect indication recognition component 202. Such application characteristics 250 in general correspond to data stored in association with the application in the indirect indication recognition component 202. The e-mail client 212 provides e-mail data 252 to the indirect indication recognition component 202. Such e-mail data 252 generally correspond to e-mail related data that is stored in the indirect indication recognition component 202, such as attachment types, message classifications, addresses, other data, or combinations of these.

In an example, the application 210 provides application content 254, and the e-mail client 212 provides e-mail content, to a privacy filter 204. The privacy filter 204 in an example selectively implements a display privacy filter to obscure content being presented on the display 208. An enable input 206 in an example enables or disables the application of a display privacy filter when conveying the application content 254 or the e-mail content to the display 208 for presentation. In various examples, the indirect indication recognition component 202 determines, based on various inputs from sensors or the application 210 or e-mail client 212, whether or not to assert the enable input 206 of the privacy filter 204.

Figure 3:
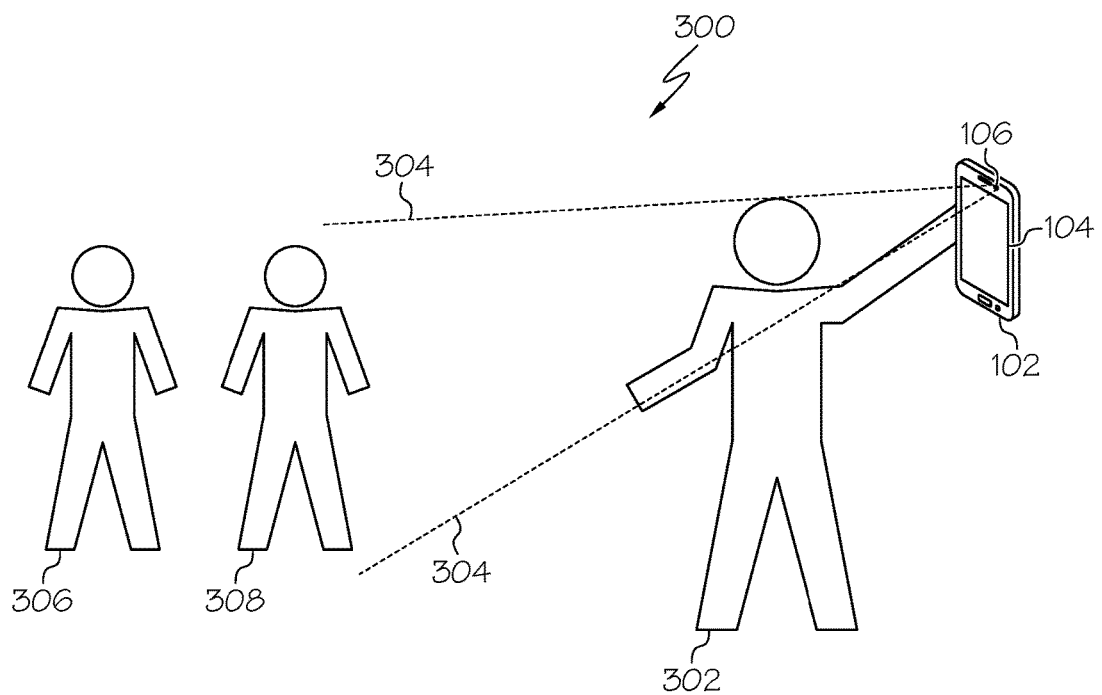
FIG. 3 depicts a persons detection scenario, according to an example.

FIG. 3 depicts a persons detection scenario 300, according to an example. The persons detection scenario 300 presents an arrangement of an electronic device 102 and various persons who may be in a position to view a display 104 of the electronic device 102. The illustrated electronic device 102 is similar to the electronic device 102 discussed above.

The persons detection scenario 300 depicts a user 302 who is holding the electronic device 102. It is assumed that user 302 is an intended and authorized person to view the content presented on the display 104. The display 104 in this example has a known viewable angle defined by viewable area boundaries 304. Based on the design of display 104, eyes of a person within the viewable area, and thus within the viewable area boundaries 304, are able to see content presented on the display 104. Persons outside of the viewable area boundaries 304 in an example will not be able to see content on the display. In various examples, certain display designs have a known and fixed viewing angle that is less than the full hemisphere in front of the display 104.

The depicted electronic device 102 is shown to have a camera 106. The camera 106 in this example is able to capture images of objects within the viewable area boundaries 304. In an example, the edges of the view angle of the camera 106 corresponds to the viewable area boundaries 304. In a further example, the edges of the view angle of the camera 106 extend beyond the viewable area boundaries 304. In such an example, processing of images captured by the camera 106 is limited to objects in the image that are within the viewable area boundaries 304.

A first by-stander 306 and a second by-stander 308 are also shown to be near the user 302 and within the viewable area boundaries 304. As such, the first by-stander 306 and second by-stander 308 are in a position to view the display 104 of the electronic device 102. In an example, the camera 106 captures images within the viewable area boundaries 304 whenever content is presented on the display 104. These images are processed by the camera image processing component 226 to determine the number of persons within the viewable area boundaries 304. Such determination is able to include, for example, image processing to identify faces of people within the image. Such identifications in an example include identifying the eyes in the face of the person. In some examples, only faces with eyes facing the camera 106, and thus the display 104, are counted as persons in viewable positions of the display 104.

Figure 4:
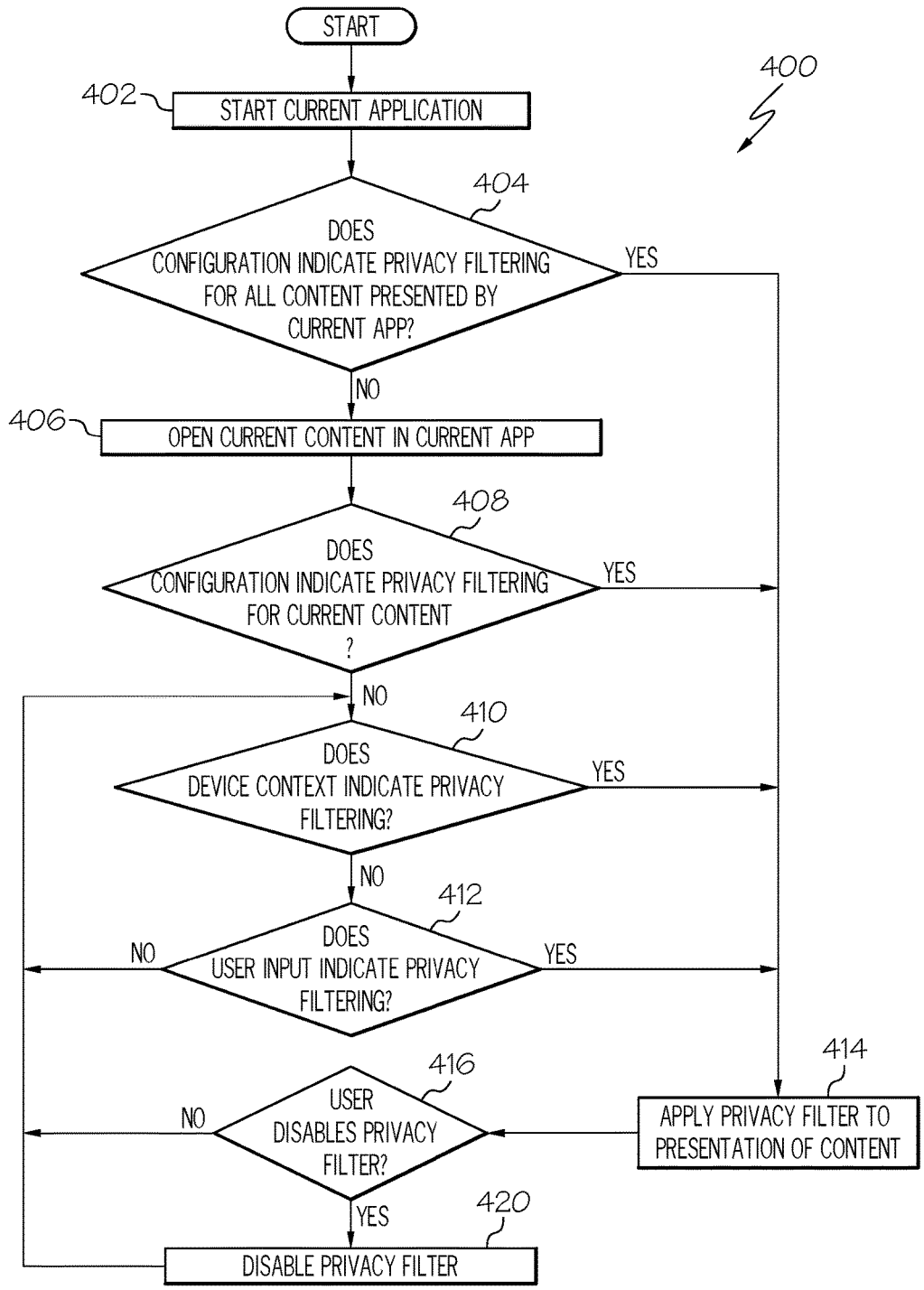
FIG. 4 illustrates an indirect indication recognition process, according to an example.

FIG. 4 illustrates an indirect indication recognition process 400, according to an example. The indirect indication recognition process 400 in an example is performed by a processor within a device and includes processing performed by the indirect indication recognition component 202 described above.

The indirect indication recognition process 400 begins by staring, at 402, a current application. In various examples, the current application is able to be any application that a device can execute and is assumed to be a currently executing application that is providing content to be displayed by the device. In an example, the current application is an e-mail client.

The indirect indication recognition process 400 continues by determining, at 404, whether the configuration of the device indicates privacy filtering for all content presented by the current application. In an example, the indirect indication recognition component 200 performs this determination based upon its configuration data and the above described inputs it receives. If this indication is true, the privacy filter is applied, at 414, to the presentation of content.

If the indication that privacy filtering is not to be applied to all content presented by the current application, current content in the current application is opened, at 406. Opening content in various examples is able to include opening an e-mail message, document, web page, other documents, other presentations, other content, or combinations of these.

A determination is made, at 408, as to whether the configuration indicates that privacy the current content is to be applied for the current content. In an example, the indirect indication recognition component 200 performs this determination based upon its configuration data and the above described inputs it receives. If this indication is true, the privacy filter is applied, at 414, to the presentation of content.

If the indication that privacy filtering is not to be applied to the present content, a determination is made, at 410, as to whether a device context indicates that privacy filtering is to be applied. Examples of such device contexts include, but are not limited to, the above described condition of the device such as a geographic location of the device being within an excluded geographical area, a number of persons in viewable locations being above a threshold, other device conditions, ambient conditions, scenarios, other contexts, or combinations of these. In an example, the indirect indication recognition component 200 performs this determination based upon its configuration data and the above described inputs it receives. If this indication is true, the privacy filter is applied, at 414, to the presentation of content.

If the indication that privacy filtering is not to be applied based on device context, a determination is made, at 412, as to whether a user input device context indicates that privacy filtering is to be applied. Examples of such device contexts include, but are not limited to, the above described text inputs, emojis, fingerprint scans, screen gestures, other inputs, or combinations of these. In an example, the indirect indication recognition component 200 performs this determination based upon its configuration data and the above described inputs it receives. If this indication is true, the privacy filter is applied, at 414, to the presentation of content. If this indication is false, the indirect indication recognition process 400 returns to determining, at 410, as to whether a device context indicates that privacy filtering is to be applied.

Returning to applying, at 414, a privacy filter to presentation of content, after applying such a privacy filter, the indirect indication recognition process 400 determines, at 416, whether the user disables the privacy filter. In various examples, the privacy filter is able to be disabled by any suitable technique or user input. If this determination is true, the privacy filter is disabled, at 420. If this determination is false, or after disabling the privacy filter at 420, the 400 returns to determining, at 410, as to whether a device context indicates that privacy filtering is to be applied.

Figure 5:
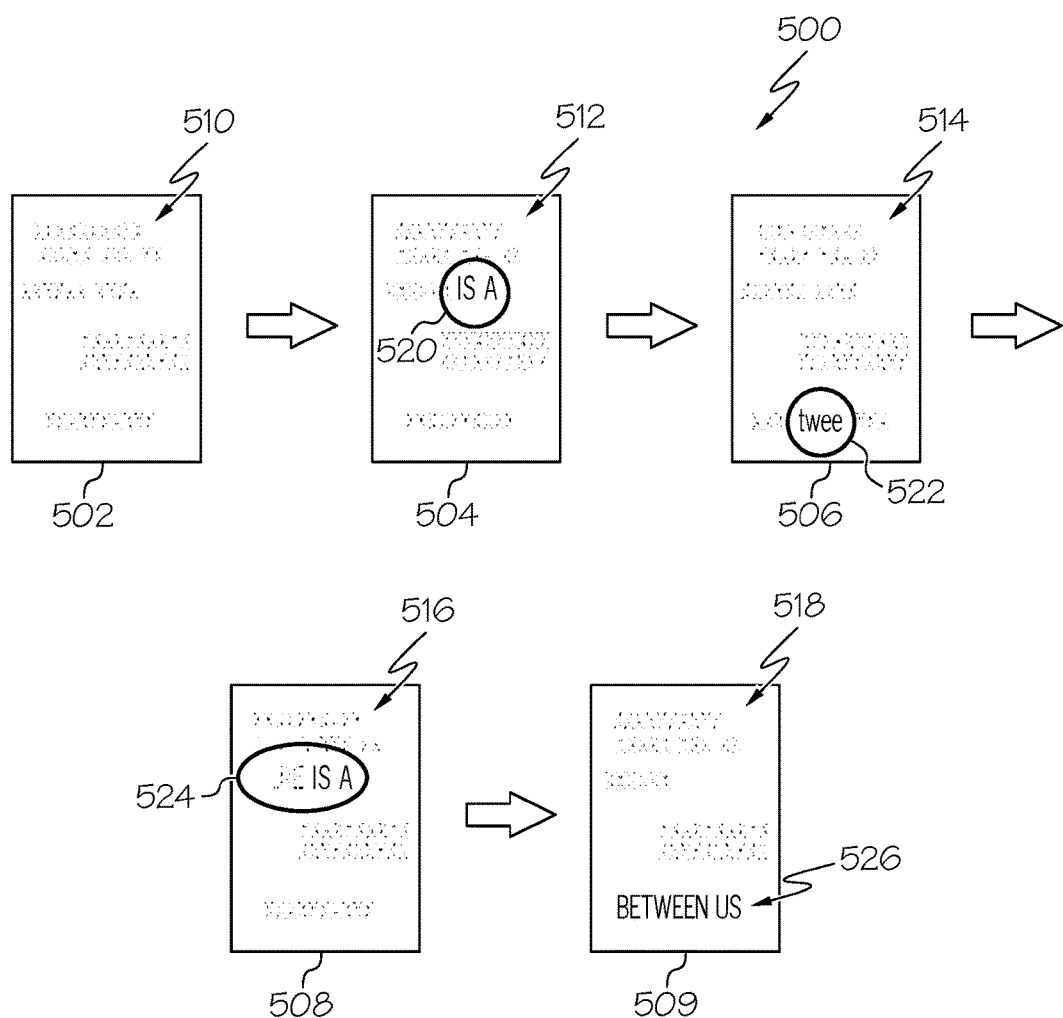
FIG. 5 illustrates a display privacy filter operation, according to an example.

FIG. 5 illustrates a display privacy filter operation 500, according to an example. The privacy filter operation 500 depicts five example states of a presentation of a received text message that is obscured by a privacy filter. The privacy filter operations 500 depicts various techniques for clearly presenting exposed portions of content that is otherwise obscured by a display privacy filter.

A first privacy filter state 502 depicts a completely obscured presentation 510. In various examples, a privacy filter is able to obscure visual presentable content by, for example, blurring or presenting an unfocused image, presenting an image to which random or pseudo-random visual "noise" is added, by presenting an image that darkens or "blanks" portions that are to be obscured, by any other technique, or by combinations of these.

A second privacy filter state 504 depicts a first partially exposed presentable content 512. The first partially exposed presentable content 512 is similar to the completely obscured presentation 510 except that a first exposed portion 520 of the presentable content is presented in clear form while the remainder of the presentation remains obscured. In the illustrated example, the display privacy filter is operating in a circle mode whereby a circular region is presented in clear form. In further examples, a display privacy filter is able to operate in a line mode whereby an exposed portion that consists of a line is displayed. In various examples the height and width of the line is able to be based on any suitable criteria, such as a line that is an entire length of the presentation, any other width, or combinations of these.

In various examples, a user is able to specify the location of the first exposed portion 520 by any suitable technique. In an example, a user is able to touch a touch sensitive screen presenting the totally obscured presentation 510 at a location and the first exposed portion 520 is presented at or near the location of that touch. In another example, other user interface facilities, such as a trackball, trackpad, arrow buttons, other user interface devices, or combinations of these, are able to be used to specify, move, or specify and move, a location of the first exposed portion 520. In such a manner, a user is able to expose different portions of the entire message that is obscured in the completely obscured presentation. By exposing different portions of the display, a user is eventually able to view the entirety of the display one portion at a time. The illustrated first exposed portion 520 is shown as a circle. In further examples, other modes, such as the above described "line mode" or "smear mode" is alternatively able to be used to present the first exposed portion.

A third privacy filter state 506 depicts a second partially exposed presentable content 514. The second partially exposed presentable content 514 is similar to the first partially exposed presentable content 512 except that a second exposed portion 522 of the presentable content is presented at a different location than the first exposed portion 520. The second exposed portion 522 depicts an example of a movement of the first exposed portion by, for example, a user dragging his or her finger from a location at or close to the first exposed portion 520 to a location at or close to the second exposed portion 522. In some examples that use other modes, such as "line mode" or "smear mode," the second exposed portion 522 also uses that selected mode to present the exposed portion. The depicted second exposed portion 522 is also a circle, as is depicted for the first exposed portion 522 discussed above.

A fourth privacy filter state 508 depicts a third partially exposed presentable content 516. The third partially exposed presentable content 516 includes a third exposed portion 524 that operates in "smear mode." As discussed above, smear mode exposes unobscured content in areas selected by the user, such as being touched, of the display and leaves them exposed for an interval of time. The "smear mode" allows portions of the display to be exposed by moving the selected location and thus exposing the content along the path where the user's finger touched within that time interval. The third exposed portion 524 shows the same clearly text, "IS A," as is presented in the second exposed portion 522. The third exposed portion 524 also presents some text to the left of the "IS A" that is gradually being re-obscured. The text within the third exposed portion 524 is "HERE IS A" with the "HE" being obscured more than the "RE."

A fifth privacy filter state 509 depicts a fourth partially exposed presentable content 518. The fourth partially exposed presentable content 519 includes a fourth exposed portion 526 that operates in "line mode" or "input mode." As described above, "input mode" operates by obscuring all of the display except for a line that corresponds to an area of the display that presents text or other data that a user is presently inputting. The depicted fourth exposed portion is an example of such an area of the display that has the most recently altered information. In this example of an instant messaging application, the last 'part' of the conversation is exposed, which is the last line of the presently viewed message.

Figure 6:
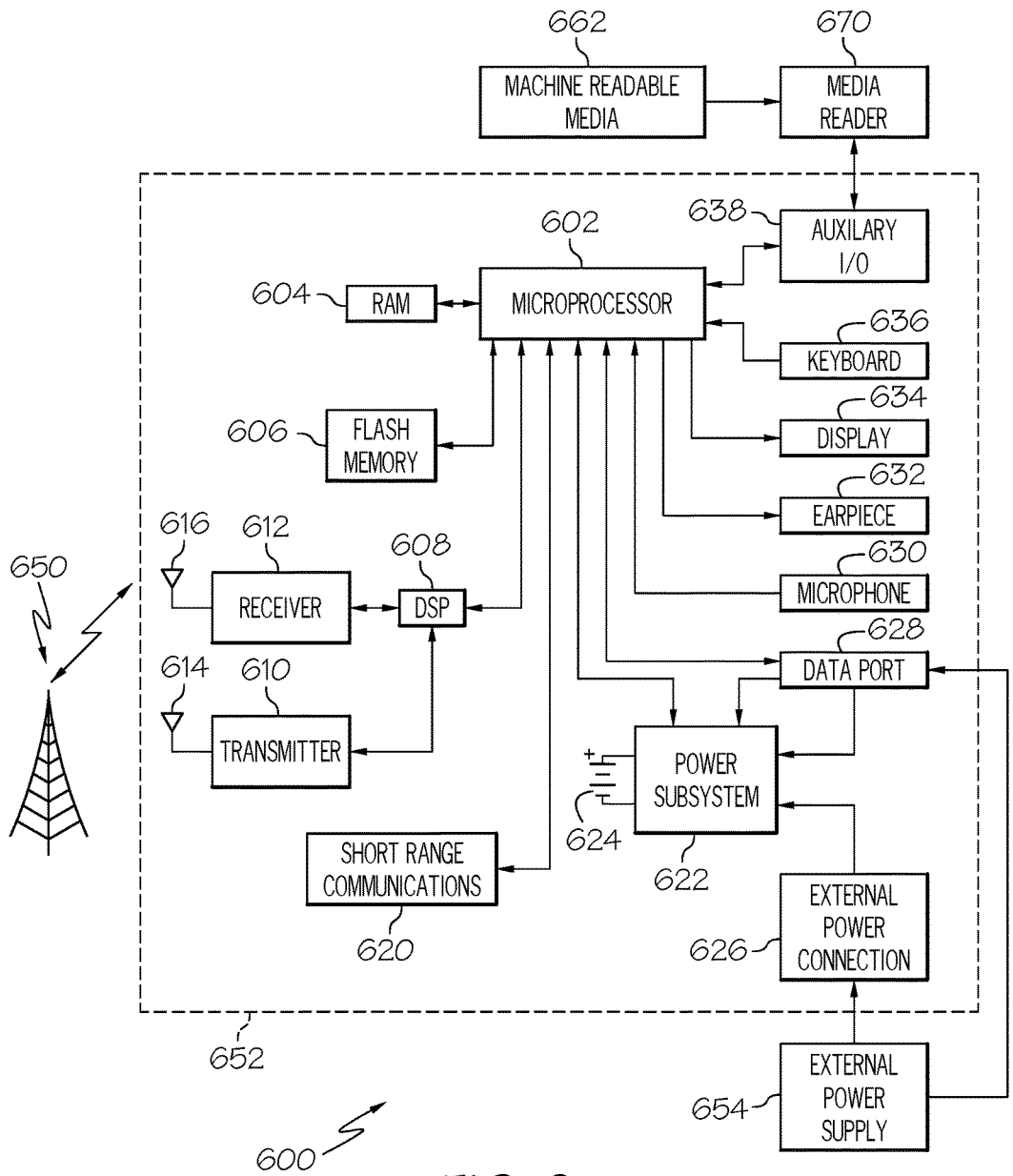
FIG. 6 is a block diagram of an electronic device and associated components in which the systems and methods disclosed herein may be implemented.

FIG. 6 is a block diagram of an electronic device and associated components 600 in which the systems and methods disclosed herein may be implemented. The electronic device 652 in this example is a wireless two-way communication device with one or more of the following: voice, text, and data communication capabilities. Such electronic devices communicate with a wireless voice, text, or data network 650 using a suitable wireless communications protocol. Wireless voice communications may be performed using either an analog or digital wireless communication channel. Data communications allow the electronic device 652 to communicate with other computer systems via the Internet. Examples of electronic devices that are able to incorporate the above described systems and methods include, for example, a data messaging device, a two-way pager, a cellular telephone with text and data messaging capabilities, a wireless Internet appliance or a data communication device that may or may not include telephony capabilities.

The illustrated electronic device 652 is an example electronic device that includes two-way wireless communications functions. Such electronic devices may incorporate communication system elements such as a wireless transmitter 610, a wireless receiver 612, and associated components such as one or more antenna elements 614 and 616. A digital signal processor (DSP) 608 performs processing to extract data from received wireless signals and to generate signals to be transmitted. The particular design of the communication system may be dependent upon the communication network and associated wireless communications protocols with which the device is intended to operate.

The electronic device 652 includes a microprocessor 602 that controls the overall operation of the electronic device 652. The microprocessor 602 interacts with the above described communications system elements and also interacts with other device systems. In various examples, the electronic device 652 is able to include one or more of various components such as a flash memory 606, random access memory (RAM) 604, auxiliary input/output (I/O) device 638, data port 628, display 634, keyboard 636, earpiece 632, audio sound reproduction system 670, microphone 630, a short-range communications system 620, a power system 622, other systems, or combinations of these.

One or more power storage or supply elements, such as a battery 624, are connected to a power system 622 to provide power to the circuits of the electronic device 652. The power system 622 includes power distribution circuitry for providing power to the electronic device 652 and also contains battery charging circuitry to manage recharging the battery 624 (or circuitry to replenish power to another power storage element). The power system 622 receives electrical power from external power supply 654. The power system 622 is able to be connected to the external power supply 654 through a dedicated external power connector (not shown) or through power connections within the data port 628. The power system 622 includes a battery monitoring circuit that is operable to provide a status of one or more battery status indicators, such as remaining capacity, temperature, voltage, electrical current consumption, and the like, to various components of the electronic device 652.

The data port 628 is able to support data communications between the electronic device 652 and other devices through various modes of data communications, such as high speed data transfers over an optical communications circuits. Data port 628 is able to support communications with, for example, an external computer or other device. In some examples, the data port 628 is able to include electrical power connections to provide externally provided electrical power to the electronic device 652, deliver electrical power from the electronic device 652 to other externally connected devices, or both. Data port 628 of, for example, an electronic accessory is able to provide power to an electronic circuit, such as microprocessor 602, and support exchanging data between the microprocessor 602 and a remote electronic device that is connected through the data port 628.

Data communication through data port 628 enables a user to set preferences through the external device or through a software application and extends the capabilities of the device by enabling information or software exchange through direct connections between the electronic device 652 and external data sources rather than via a wireless data communication network. In addition to data communication, the data port 628 provides power to the power system 622 to charge the battery 624 or to supply power to the electronic circuits, such as microprocessor 602, of the electronic device 652.

Operating system software used by the microprocessor 602 is stored in flash memory 606. Examples of flash memory 606 are able to include, for example, flash memory, magnetic based storage devices, other volatile or non-volatile data store elements, or the like. Some examples are able to use flash memory 606 that includes a battery backed-up RAM or other non-volatile storage data elements to store operating systems, other executable programs, or both. The operating system software, device application software, or parts thereof, are able to be temporarily loaded into volatile data storage such as RAM 604. Data received via wireless communication signals or through wired communications are also able to be stored to RAM 604. The microprocessor 602 in some examples are able to execute program components, such as is able to be defined in flash memory 606 in one example, that cause the microprocessor 602 to perform the above described processes and methods.

The microprocessor 602, in addition to its operating system functions, is able to execute software applications on the electronic device 652. A set of applications that control basic device operations, including at least data and voice communication applications, is able to be installed on the electronic device 652 during manufacture. In an example, programs and other data used to support the processes described above are able to be installed in the memory of the electronic device 652. Further examples of applications that are able to be loaded onto the device may be a personal information manager (PIM) application having the ability to organize and manage data items relating to the device user, such as, but not limited to, e-mail, calendar events, voice mails, appointments, and task items. The applications are able to include the above described base applications, which may be installed during manufacture or from another trusted and verified source, along with user applications that may be installed at any time.

Further applications may also be loaded onto the electronic device 652 through, for example, the wireless network 650, an auxiliary I/O device 638, Data port 628, short-range communications system 620, or any combination of these interfaces. Such applications are then able to be installed by a user in the RAM 604 or a non-volatile store for execution by the microprocessor 602.

In a data communication mode, a received signal such as a text message or web page download is processed by the communication system, including wireless receiver 612 and wireless transmitter 610, and communicated data is provided the microprocessor 602, which is able to further process the received data. In some examples, the electronic device 652 includes a display, output ports, or combinations of these. In such examples, the received data is able to be processed for output to the display 634, or alternatively, to an auxiliary I/O device 638 or the Data port 628. In examples of the electronic device 652 that include a keyboard 636 or other similar input facilities, a user of the electronic device 652 may also compose data items, such as e-mail messages, using the keyboard 636, which is able to include a complete alphanumeric keyboard or a telephone-type keypad, in conjunction with the display 634 and possibly an auxiliary I/O device 638. Such composed items are then able to be transmitted over a communication network through the communication system.

For voice communications, overall operation of the electronic device 652 is substantially similar, except that received signals are generally provided to an earpiece 632 and signals for transmission are generally produced by a microphone 630. Alternative voice or audio I/O systems, such as a voice message recording system, may also be implemented on the electronic device 652. Although voice or audio signal output is generally accomplished primarily through the earpiece 632, in examples of electronic devices 652 that include a display 634, the display 634 may also be used to provide an indication of the identity of a calling party, the duration of a voice call, or other voice call related information, for example.

Depending on conditions or statuses of the electronic device 652, one or more particular functions associated with a system circuit may be disabled, or an entire system circuit may be disabled. For example, if the battery temperature is low, then voice functions may be disabled, but data communications, such as e-mail, may still be enabled over the communication system.

A short-range communications system 620 provides for data communication between the electronic device 652 and different systems or devices, which need not necessarily be similar devices. For example, the short-range communications system 620 includes an infrared device and associated circuits and components or a Radio Frequency based communication module such as one supporting Bluetooth® communications, to provide for communication with similarly-enabled systems and devices, including the data file transfer communications described above. The short-range communications system is also able to include one or more of components to support communications over wireless links such as Wi-Fi®, Near Field Communications (NFC), any other short range link, or combinations of these A media reader 660 is able to be connected to an auxiliary I/O device 638 to allow, for example, loading computer readable program code of a computer program product into the electronic device 652 for storage into flash memory 606. One example of a media reader 660 is an optical drive such as a CD/DVD drive, which may be used to store data to and read data from a computer readable medium or storage product such as computer readable storage media 662. Examples of suitable computer readable storage media include optical storage media such as a CD or DVD, magnetic media, or any other suitable data storage device. Media reader 660 is alternatively able to be connected to the electronic device through the Data port 628 or computer readable program code is alternatively able to be provided to the electronic device 652 through the wireless network 650.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-transitory computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method, comprising:
receiving content to be displayed on a device, the content comprising a plurality of images comprising at least one image and an image of a most recently received notification that is different from each of the at least one image;
determining that the device is in a face up position;
determining an indirect indication of a condition of the device associated with applying a display privacy filter to a presentation of the device, wherein the indirect indication comprises a determination that the device is in a face up position; and
applying, based on receiving the indirect indication, the display privacy filter to presentations of the content, wherein applying the display privacy filter comprises obscuring a respective display of each of the at least one image in the plurality of images and not obscuring the image of the most recently received notification.

2. The method of claim 1, wherein the indirect indication is further based on a context of the device.

3. The method of claim 2, further comprising:
determining a location of the device, and
wherein the context comprises the location of the device being within a defined area.

4. The method of claim 2, further comprising:
determining a presence of a plurality of persons being in a viewable location of a display of the device, and
wherein the context comprises the plurality of persons being in the viewable location.

5. The method of claim 4, wherein the determining the presence is based upon analysis of at least one image captured by a camera on the device.

6. The method of claim 1, wherein the indirect indication is further based on receiving an input from a user interface of the device.

7. The method of claim 6, wherein the input comprises an input pattern entered on a keyboard of the device, where the input pattern comprises at least one of a keyword or emoji.

8. The method of claim 6, wherein the input comprises a gesture comprising at least one of a multi-touch gesture, a fingerprint scan, or response to a notification.

9. The method of claim 1, wherein the content comprises data presented by an application, and wherein the indirect indication further comprises at least one of:
a classification of the application in an application repository providing the application to the device;
an indication of a prevalence of display privacy mode setting enabled by a plurality of other users of the application on other devices; or
an indication provided by the application based upon a mode of the application.

10. The method of claim 1, wherein the content comprises data within a document, and wherein the indirect indication is further based on a characterization of the document.

11. The method of claim 10, wherein the characterization of the document comprises one of:
a stored setting associated with a web page containing the content;
a stored setting associated with an application file containing the content; or
a type of the document.

12. The method of claim 10, wherein the content comprises data within an e-mail message, and wherein the characterization of the content comprises at least one of:
an attachment type of an attachment to the e-mail message that is being presented;
an e-mail address in the e-mail message;
an indicated sensitivity for the e-mail message; or
a presence of a cryptographic signature in the e-mail message.

13. The method of claim 1, further comprising unobscuring a selected portion of the presentations based on user input, the unobscuring comprising:
receiving a first input indicating a selected area as a first area of the presentations corresponding to a first part of the selected portion;
presenting, based upon receiving the first input, presentable content within the first area;
receiving a second input indicting movement from the first area of the presentations to a second area of the presentations;
extending, based upon receiving the second input, the selected portion to include a second part of the selected portion, the second part of the selected portion comprising the second area of the presentations; and
gradually re-obscuring, after a time interval after receiving the second input, the first area of the presentations.

14. The method of claim 1, wherein the display privacy filter obscures a portion of the presentation while clearly presenting an exposed portion comprising at least a portion of the at least one image.

15. The method of claim 14, wherein the display privacy filter clearly presents the exposed portion in at least one of a:
circle mode clearly presenting the exposed portion as a circular area of the presentations;
line mode clearly presenting the exposed portion as at least a portion of a line of the presentations; or
a smear mode clearly presenting a first portion of the exposed portion and gradually obscuring a remaining portion of the exposed portion outside of the first portion.

16. A display processor, comprising:
an indirect indication recognition processor configured to:
receive content to be displayed on a device, the content comprising a plurality of images comprising at least one image and an image of a most recently received notification that is different from each of the at least one image;
determine that the device is in a face up position; and
determine an indirect indication of a condition of the device associated with applying a display privacy filter to a presentation of the device, wherein the indirect indication comprises a determination that the device is in a face up position; and
a display privacy filter configured to apply, based on the indirect indication, the display privacy filter to presentations of the content, wherein application of the display privacy filter comprises obscuring a respective display of each of the at least one image in the plurality of images and not obscuring the image of the most recently received notification.

17. The display processor of claim 16, further comprising a location sensor configured to determine a location of the device, and
wherein the indirect indication further comprises the location of the device being within a defined area.

18. The display processor of claim 16, further comprising an image processor configured to determine a presence of a plurality of persons being in a viewable location of a display presenting the content, and
wherein the indirect indication further comprises the plurality of persons being in the viewable location.

19. The display processor of claim 16, further comprising a user interface,
wherein the indirect indication is further based on receiving an input from a user interface of the device,
wherein the input comprises:
an input pattern entered on a keyboard of the device, where the input pattern comprises at least one of a keyword or emoji; and
a gesture comprising at least one of a multi-touch gesture,
a fingerprint scan, or
a response to a notification.

20. A non-transitory computer readable storage medium having computer readable program code embodied therewith, the computer readable program code comprising instructions for:
receiving content to be displayed on a device, the content comprising a plurality of images comprising at least one image and an image of a most recently received notification that is different from each of the at least one image;
receiving a determination that the device is in a face up position;
determining an indirect indication of a condition of the device associated with applying a display privacy filter to a presentation of the device, wherein the indirect indication comprises the determination that the device is in a face up position; and
applying, based on receiving the indirect indication, the display privacy filter to presentations of the content, wherein applying the display privacy filter comprises obscuring a respective display of each of the at least one image in the plurality of images and not obscuring the image of the most recently received notification.

* * * * *